United States Patent Office 3,310,564
Patented Mar. 21, 1967

3,310,564
NOVEL 4-ALKOXY NAPHTHALIMIDES
Toshiyasu Kasai, 3070 Midorigaoka, Meguro-ku,
Tokyo, Japan
No Drawing. Filed Jan. 18, 1962, Ser. No. 167,183
Claims priority, application Japan, Jan. 21, 1961,
36/1,946; Jan. 26, 1961, 36/2,405, 36/2,406; Feb.
12, 1961, 36/4,782
13 Claims. (Cl. 260—281)

This invention relates to novel organic compounds and the process for producing the same. Particularly this invention relates to novel organic compounds, which, when applied to off-white materials, absorb ultraviolet light from sunlight or fluorescent light and emit the adsorbed energy as blue light, and the process for producing the said organic compounds. In still another aspect, the present invention is concerned with a method of improving the white appearance of higher molecular weight polymeric shaped articles and the shaped articles so improved.

Up to the present, very few studies have been made in connection with the relationship between the chemical structure and whitening effect of organic compounds. As the result of my studies in the whitening effect of a series of naphthalic acid compounds, now it has been found that a naphthalic acid compound, when an electron-donating group is introduced into the naphthalene nucleus of the compound, can emit purple or blue light which compensates for yellow tints. Particularly it has been found that a variety of naphthalimides and the derivatives thereof, all of which have at least one alkoxy group in their naphthalene nucleus have unique whitening properties as well as good affinity to fiber and high resistance against light, thermal and chemical attack. A group of those novel organic compounds which I discovered are valuable as whitening agents for substantially all types of fibers which are heretofore known.

It is accordingly one object of the invention to provide novel organic compounds which are valuable as whitening agents.

Another object of the present invention is to provide novel organic compounds having excellent whitening properties for polyester synthetic fibers which are known to be dyed only with Uvitex ER and ERN conc. (Registered trades names of commercially available whitening agents manufactured and sold by Ciba Limited.)

Still another object of the present invention is to provide a process for producing the above-mentioned compounds.

A further object of the present invention is to provide another process for producing the above-mentioned compounds on a commercial scale.

A still further object of the present invention is to provide a method for improving the white appearance of high molecular polymeric shaped articles by using the above-mentioned compounds.

Other objects, features, capabilities and advantages as comprehended by the present invention will be apparent from the description and claims which follow.

Novel organic compounds of the present invention can be represented by the following general Formula I

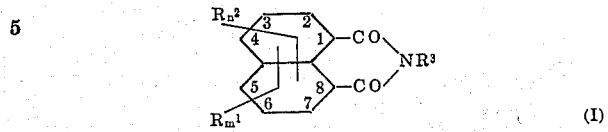

wherein $R^1$ means lower alkoxy group; $R^2$ means a substituent other than lower alkoxy group; $R^3$ means hydrogen atom, or alkyl, cycloalkyl, aralkyl, aryl or heterocyclic radical; and $m$ is an integer of 1 to 6 and $n$ is that of 0 to 5, the sum of $m$ plus $n$ being equal to or less than 6.

In the above-indicated general Formula I, $mR^1$, which may be the same or different, are lower alkoxy groups, e.g. methoxy, ethoxy, n-propoxy, isopropoxy, butoxy, pentoxy, hexoxy, heptoxy, etc. For the compounds of the present invention at least one lower alkoxy group should be positioned in their naphthalene nucleus, preferably at the 4- or/and 2-position. $nR^2$, which also may be the same or different, are substituents other than lower alkoxy groups. Such substituents may be halogen atoms, e.g. chlorine, bromine or iodine, nitro group, nitrile group, hydroxy group, alkyl group, hydroxyalkyl group, sulfonic group, diazonium group, amino group, and the like. $R^3$ indicates hydrogen atom or a monovalent organic radical, such as unsubstituted or substituted alkyl, e.g. methyl, ethyl, propyl, butyl, pentyl or the like, hydroxymethyl, hydroxyethyl, hydroxypropyl or the like, and N,N-dialkylaminoalkyl; aralkyl, e.g. unsubstituted or substituted phenyl and naphthyl, N,N-dialkylaminophenyl, N,N-dialkylaminonaphthyl, etc.; and heterocyclic radical, e.g. 2,6-dihalo-s-triazinyl, aminopyridyl, pyrrazolyl, etc.

As apparent from the above-mentioned explanation, the terms, "alkyl" and "aryl," and their similar expression used in the specification and claims should be understood as including those which may be substituted with any other substituent, e.g. hydroxyl or dialkylamino group.

Among the organic compounds having the general Formula I, those which are particularly important for the purposes of the invention can be represented by the general Formula II

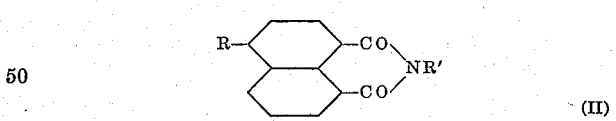

wherein R means lower alkoxy group, especially methoxy or ethoxy group and R′ means hydrogen atom or lower alkyl group which may be substituted, especially methyl, ethyl, isopropyl, n-propyl, butyl or N,N-dialkylaminoalkyl, or aryl group, especially phenyl, tolyl, methanyl, 3′-methylolphenyl or 4′-N,N-dialkylamino-phenyl.

All the compounds defined by the general Formula I are suitable as whitening agents for natural and synthetic fibrous materials (semi-synthetic material inclusive), e.g. polyesters, cellulosic acetate, polyvinyl, polyamides, woolen, cotton, linen and other fibers as well as papers.

In the practice of the present invention, the compounds having the general Formula I can be easily prepared by condensing alkoxylated naphthalic acid of the general Formula III

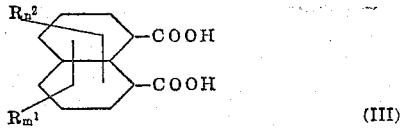

(wherein $R^1$, $R^2$, $m$ and $n$ are the same as defined with reference to the general Formula I) or the anhydride thereof or the mixture of both with ammonia or a primary amine having the general formula $R^3NH_2$ (wherein $R^3$ is the same as defined in the general Formula I).

Suitable compounds which can be employed as one of the reactants for the condensation reaction include: 4-methoxynapthalic acid, 4-ethoxynaphthalic acid, 4-propoxynapthalic acid, 4-butoxynaphthalic acid, 4-methoxynaphthalic acid anhydride (M.P. 255–6° C.), 4-ethoxynaphthalic acid anhydride (M.P. 183–4° C.), 4-propoxynaphthalic acid anhydride, 4-butoxynaphthalic acid anhydride, 2-methoxynaphthalic acid anhydride (M.P. 255° C.), 2-ethoxynaphthalic acid anhydride, 3-methoxynaphthalic acid anhydride (M.P. 243–4° C.), 3-ethoxynaphthalic acid anhydride (M.P. 224–5° C.), 3,4-dimethoxynaphthalic acid anhydride (M.P. 280° C.) and the like.

Ammonia used herein may be in the form of aqueous ammoniac solution or of liquid ammonia. Suitable primary amines which are employed as the other reactant for the reaction include alkyl amines, e.g. methyl amine, ethyl amine, isopropyl amine, n-propyl amine, butyl amine, etc., alkanol amines including methanolamine, ethanolamine, and N,N-dialkylaminoalkyl amines including N,N-dimethylaminoethyl amine; cycloalkyl amines, e.g. cyclopentyl amine, cyclohexyl amine; aralkyl amines, e.g. benzyl amine, m-, o- and p-alkylbenzyl amines; aryl amines, e.g. phenyl amine, naphthyl amine, halophenyl amines, tolyl amines, methanyl amine, sulfanyl amine, N,N-dialkylaminophenyl amines and N,N-dialkylaminonaphthyl amines; heterocyclic amines, e.g. aminopyridine, aminopyrrazole.

In order for carrying out the condensation reaction in effect, ammonia or a primary amine should be used in an amount of stoichiometrically equimolar to or excessive than the amount of the naphthalic acid (III) or the anhydride thereof or the mixture of both. Water or an organic solvent may be used as a reaction medium, if desired. Suitable organic solvents include glacial acetic acid, lower aliphatic alcohols, benzene and the like. The reaction generally can be carried out at a temperature of more than 70° C., and especially of from 100° to 110° C. For the condensation reaction, any known condensation catalyst can be used, but the use of such catalyst is not critical for the condensation reaction now concerned.

In another process of the invention, a compound having the general Formula IV

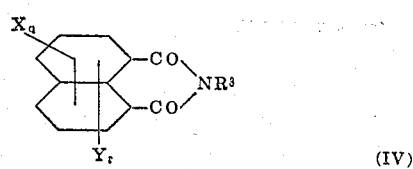

(wherein $R^3$ has the same meaning as in the general Formula I; each of $qX$ is a group capable of being alkoxylated, e.g. halogen atom, hydroxy group, nitro group, amino group, diazonium group and sulfonic group; each $rY$ is a substituent other than lower alkoxy group and incapable of being alkoxylated, e.g. alkyl and nitrile group; and $q$ is an integer of 1 to 6 and $r$ is that of 0 to 5, the sum of $q$ plus $r$ being not greater than 6) is reacted wtih an alkoxylating agent in the amount of about $p$ moles per mole of the compound (IV), provided that $p$ is an integer of 1 to 6 and not greater than $q$, whereby a compound having the general Formula V

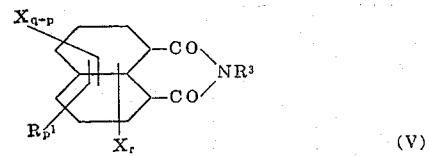

(wherein $R^1$ is the same as defined in the general Formula I), the said general Formula V substantially corresponding to that (I).

Within the coverage of the just above-mentioned embodiment of the invention, however, it is to be appreciated that the following reaction is particularly important, namely

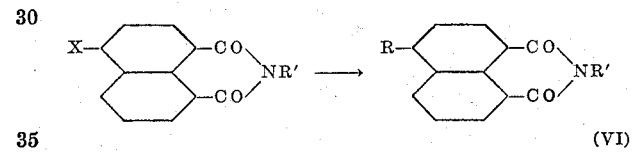

wherein X means halogen atom, hydroxy, nitro, amino, diazonium or sulfonic group and both R and R' are the same as defined in the general Formula II.

In the instant reaction, suitable alkoxylating agents may be alkali metal alcoholates, e.g. sodium methylate, sodium ethylate, etc. and the combination of alkali metal with a lower aliphatic alcohol, e.g. Na plus methanol or ethanol. In addition, the term, "alkoxylating agents," and the similar expression used herein should be understood as including alkylating agents so commonly named, such as dialkyl sulfates and alkyl halides, in the case where a group (X) or groups ($qX$) to be alkoxylated is hydroxyl group.

Suitable compounds to be alkoxylated include: 4-chloronaphthalimide (M.P. 301–302° C.) and their N-substituted derivatives, 4-bromonaphthalimide (M.P. 286° C.) and their N-substituted derivatives, 4-hydroxynaphthalimide (M.P.>350° C.) and their N-substituted derivatives, 4-nitronaphthalimide (M.P. 287–8° C.) and their N-substituted derivatives, 4-aminonaphthalimide and their N-substituted derivatives, 4-sulfonaphthalimide and their N-substituted derivatives, and 4-diazoniumnaphthalimide and their N-substituted derivatives. Dihalonaphthalimides, e.g. 3,6-dichloronaphthalimide (M.P. 327–8° C.) and 4,5-dichloronaphthalimide (M.P. 372–4° C.) also are included.

In carrying out the alkoxylation reaction in effect, both of the compounds of the general Formula IV or VI and an alkoxylating agent are mixed at the approximately stoichiometrically required molar ratio, and then the resulting mixture is heated, with stirring, at a temperature approximating to the boiling point of the said mixture under an atmospheric or superatmospheric pressure (up to about 10 atm.). If it is desired, an alkoxylating catalyst which is commonly known for those skilled in the art can be used for the intended alkoxylation reaction. Such catalyst may be potassium acetate, copper acetate and the like. This alkoxylation reaction may be carried out with or without water or an organic solvent such as alcohols, benzene or the like.

In still another process of the invention, a compound having the general formula

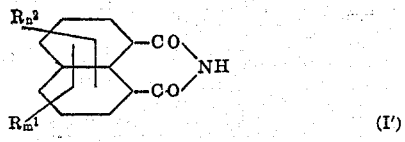

(wherein $R^1$, $R^2$, $m$, $n$ are the same as defined in the general Formula I) or the alkali metal salt thereof is condensed with a compound of the general formula $R^3$-Hal (wherein Hal means halogen atom) or still alternatively, a compound having the general formula

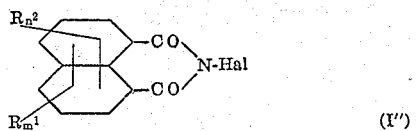

(wherein $R^1$, $R^2$, $m$, $n$ are the same as defined in the general Formula I and Hal means halogen atom) is condensed with a compound of the general formula $R^3OH$ (wherein $R^3$ is the same as in the general Formula I), whereby a compound corresponding to the general Formula I is obtained. Suitable reaction media, catalysts (acid-bonding agents) and other reaction conditions for effecting these condensation reactions (I')→(I) and (I'')→(I) can be selected by those skilled in the art with reference to the properties of desired novel compounds. Additionally speaking, the compound of the general Formula I'' can be easily prepared by dissolving the corresponding compound (I') in an alkali solution and then salting out the compound (I'') from the resulting solution by addition of alkali halide thereto.

Among the embodiments of the above-mentioned condensation reaction (I')→(I), those which are particularly important may be such that 4-alkoxylated naphthalimides or the alkali metal salts thereof are condensed with cyanuric halide at the approximate molar ratio of 1:1, thereby to produce 4-alkoxynaphthalic N-(2,4-dihalo-s-triazinyl)-imides which are particularly suitable as whitening agents for natural fibers, e.g. woolen fibers. Such also is one of the features of the present invention.

The organic compounds thus produced in the present invention are pale yellow or creamy white crystalline powder, which can yield colorless clear solutions in water or an organic solvent. They are poorly soluble in water and soluble in methanol, ethanol and acetic acid. Generally speaking these compounds are highly stable against heat, light and other physical and chemical attack, and they have the less degree of sublimation (approximately 5, rated according to a method described in JIS–L–1051 (1960). These compounds, when dispersed or dissolved in water or the alcohol, are substantive to high molecular polymeric natural and synthetic shaped articles. The articles on which such compounds have been dyed exhibit good light fastness, laundry fastness and perspiration fastness, while they are imparted with improved white appearance.

Accordingly the compounds of the general Formula I and particularly of that II are used as whitening agents for high molecular polymeric shaped articles. Such shaped articles may be in the form of filaments, yarns, threads, films, sheets, ribbons, foils or plates, or in any other shaped forms, and they may be made of natural, semi-synthetic or synthetic high polymeric materials, including vegetable fibrous materials, e.g. cotton, kapok, linen, sisal, jute, etc.; animal fibrous materials, e.g., wool, mohair, cashmere, etc.; mineral fibrous materials, e.g. asbestos; inorganic fibrous material, e.g. glass fiber, rock fiber, etc.; regenerated fibrous materials, e.g. viscose rayon; semi-synthetic fibers e.g. cellulose acetate, synthetic fibers, e.g. polyamide, polyester, polyurethan, polyvinyl chloride, polyvinylidene chloride, polyacrylonitrile, polyvinyl alcohol, etc. The use of the compounds (I) as whitening agents for those high molecular polymeric shaped articles also is one of the features of the invention. In order for application of the compounds of the general Formula I, such compounds can be permeated into or dyed on high molecular polymeric shaped articles. Alternatively, these compounds can be incorporated or combined into high polymeric materials before they have been shaped in desired form. For example, one or more of these compounds may be incorporated to a mass comprising a filament- or film-forming high polymeric material, the said compounds being in an amount of 0.1–2.0% based on the weight of the high polymeric material and then the mass is formed into a desired shape by spinning or extrusion.

In the particular aspect in the use of the compounds having the general Formula I and especially of that II, it is to be appreciated as particularly important that these compounds can be applied as whitening agent to a variety of textile materials and papers. For example, 4-alkoxynaphthalimides and 4-alkoxynaphthalic N-alkyl or -aryl imides are valuable whitening agent for polyester synthetic fibers. Now the present invention will be explained in detail in connection with a specific embodiment wherein such imide compounds as enumerated hereinabove are used for whitening or brightening polyester fibers.

Those imide compounds, singly or in combination, are uniformly dispersed or dissolved in water or a suitable solvent, with or without a suitable dispersing or permeating agent, e.g. surface active agents. With the resulting dispersion or solution, polyester fiber is treated in the usual manner as by ordinary dyeing, carrier dyeing, high temperature dyeing, or thermosol dyeing. The polyester fiber so treated absorbs ultraviolet light from sunlight or fluorescent light and emits the adsorbed energy as blue light. Thus, textile materials which are not colored are imparted with permanently durable white appearance through compensation for yellow tints, and those which have been colored are imparted with improved purity of original color and with brightness.

For additional information concerning the present invention, preparation of 4-alkoxynaphthalic acids or the anhydrides thereof will be mentioned hereinbelow.

4-hydroxyacenaphthene is reacted with an alkylating agent, such as dialkyl sulfates, e.g. dimethyl sulfate, diethyl sulfate, etc. and alkyl halides, e.g. methyl bromide, ethyl bromide, methyl iodide, ethyl iodide, etc., thereby to form 4-alkoxyacenaphthene, and then the 4-alkoxyacenaphthene is treated with an oxidizing agent, such as alkali bichromates and alkali permanganates, thereby to form 4-alkoxynaphthalic acid or its anhydride.

The 4-alkoxynaphthalic acid and its anhydride are valuable as new intermediate products for preparation of the novel organic compounds of the present invention and they as such also are useful whitening agents for natural or synthetic fibers.

The following examples describe certain ways in which the principle of the invention has been applied, but are not to be construed as limiting its scope.

*Example 1*

Ten grams of 4-methoxynaphthalic anhydride are reacted with 100 ml. of 28% ammoniac water for one hour while refluxing. After completion of the reaction, the resulted reaction mixture is cooled and then filtered. 9.5 g. of 4-methoxynaphthalimide are obtained. Yield 97% on the theoretical, M.P. 320–2° C. After recrystallization from glacial acetic acid, pure 4-methoxynaphthalimide in pale yellow plumes is obtained, which melts at 320°–1° C. The result of elementary analysis is as follows—

Calcd.: N, 5.90%. Found: N, 6.09%.

*Example 2*

Ten grams of 4-methoxynaphthalic anhydride are reacted with 100 ml. of an aqueous solution of 10% methyl amine for one hour while refluxing. After completion of the reaction, the resulted reaction mixture is cooled and filtered, whereby 9.7 g. of 4-methoxynaphthyl methyl imide are recovered as pale yellow powder. Yield 91% on the theoretical, M.P. 197–201° C. After recrystallization of this powder from glacial acetic acid, pure crystalline 4-methoxynaphthalic methyl imide melting at 200°–201° C. is obtained. The result of elementary analysis is as follows—

Calcd.: N, 5.80%. Found: N, 5.95%.

*Example 3*

Ten grams of 4-methoxynaphthalic anhydride are reacted with 100 ml. of an aqueous solution of 10% ethyl amine for one hour while refluxing. After completion of the reaction, the resulted reaction mixture is cooled and filtered. 10.5 g. of 4-methoxynaphthylic ethyl imide as pale yellow powder are obtained. Yield 94% on the theoretical. By recrystallization of the powder from glacial acetic acid, pure crystalline 4-methoxynaphthalic ethyl imide in pale yellow plumes is obtained, while melts at 152°–3° C. The result of elementary analysis is as follows—

Calcd.: N, 5.49%. Found: N, 5.57%.

*Examples 4–12*

The same procedures as in Example 3 are repeated but using one of the following reagents whereby the corresponding 4-methoxynaphthalic N-substituted imide is obtained.

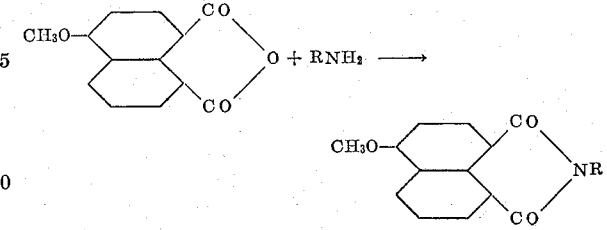

| R | Type of amines | Crude imides | | Pure imides | |
|---|---|---|---|---|---|
| | | M.P., °C. | Yield, percent | M.P., °C. | Elementary analysis |
| n-C₃H₇ | n-C₃H₇NH₂ | 93–6 | 88.0 | 111.5–2.5 | Nc: 5.20%. Nf: 5.36%. |
| i-C₃H₇ | i-C₃H₇NH₂ | 197–9 | 29.0 | 198–9 | Nc: 5.20%. Nf: 5.26%. |
| n-C₄H₉ | n-C₄H₉NH₂ | 100–3 | 78.0 | 115–6 | Nc: 4.93%. Nf: 5.12%. |
| —⟨H⟩ | ⟨H⟩—NH₂ | 173–6 | 100.0 | 186.5–7.5 | Nc: 4.53%. Nf: 4.55%. |
| —⟨ ⟩ | ⟨ ⟩—NH₂ | 206–7 | 100.0 | 235–6 | Nc: 4.62%. Nf: 4.40%. |
| —⟨CH₂OH⟩ | HOH₂C—⟨ ⟩—NH₂ | 223–6 | 95.5 | 227.5–9 | Nc: 4.20%. Nf: 4.24%. |
| —⟨ ⟩—SO₃Na | NaSO₃—⟨ ⟩—NH₂ | | | | |
| —⟨SO₃Na⟩ | NaSO₃—⟨ ⟩—NH₂ | | | | |
| —⟨ ⟩—N(CH₃)₂ | (CH₃)₂N—⟨ ⟩—NH₂ | 317–8 | 67.5 | | |

NOTE.—Nc is the calculated value of nitrogen and Nf is the experimental value of nitrogen, both values being expressed in percentage.

Examples 13-23

4-ethoxynaphthalic acid anhydride (M.P. 183-4° C.) is condensed with a variety of amine reagents (including ammoniac water) in the same manner as in the preceding examples which describe the condensation of 4-methoxynaphthalic acid anhydride with an amine reagent. The results are summarized in the following table.

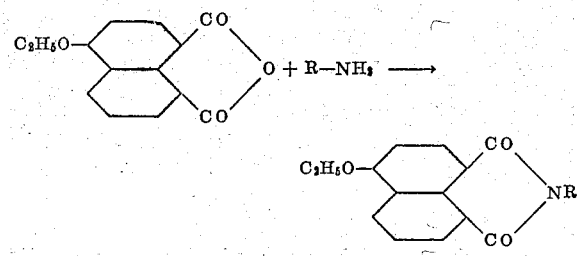

4-nitronaphthalic methyl imide (M.P. 208-9° C.)
4-nitronaphthalic ethyl imide (M.P. 187.5-188.5° C.)
4-nitronaphthalic n-propyl imide (M.P. 135.5-136.5° C.)
4-nitronaphthalic isopropyl imide (M.P. 253.5-255° C.)
4-nitronaphthalic n-butyl imide (M.P. 103.5-104.5° C.)
4-nitronaphthalic isopentyl imide (M.P. 134-5° C.)
4-nitronaphthalic hydroxyethyl imide (M.P. 155.5-156.5° C.)
4-nitronaphthalic cyclohexyl imide (M.P. 209.5-210.5° C.)
4-nitronaphthalic o-methylphenyl imide (M.P. 230-1° C.)
4-nitronaphthalic p-methylphenyl imide (M.P. 246-7° C.)
4-nitronaphthalic o-chlorophenyl imide (M.P. 207-8° C.
4-nitronaphthalic p-chlorophenyl imide (M.P. 274-5° C.) and 4-nitronaphthalic p-methoxyphenyl imide (M.P. 249-251° C.).

4-ETHOXYNAPHTHALIMIDE AND THE DERIVATIVES THEREOF

| R | M.P., °C. | Yield, percent | Elementary analysis | Appearance |
|---|---|---|---|---|
| —H | 261.5-262 | 90.3 | Nc: 5.80%<br>Nf: 5.65% | Pale yellow crystalline needles. |
| —CH$_3$ | 173.5-4 | | | Do. |
| —C$_2$H$_5$ | 132.5-133 | 94.5 | Nc: 5.20%<br>Nf.: 5.07% | Do. |
| —n-C$_3$H$_7$ | 132.5-133 | 96.0 | Nc: 4.94%<br>Nf: 4.89% | Do. |
| —iso-C$_3$H$_7$ | 135-135.5 | 31.4 | Nc: 4.94%<br>Nf: 4.81% | Do. |
| —n-C$_4$H$_9$ | 133-4 | 97.0 | Nc: 4.71%<br>Nf: 5.03% | Do. |
| —C$_6$H$_5$ | 195.5-196 | 40.3 | Nc: 4.33%<br>Nf: 4.15% | Do. |
| —C$_6$H$_4$-CH$_3$ (o) | 243-247 | | | Brown crystalline needles. |
| —C$_6$H$_4$-CH$_3$ (m) | 187.5-188.5 | | | Yellow crystalline needles. |
| —C$_6$H$_4$-CH$_3$ | 195.5-196.5 | | | |
| —C$_6$H$_4$-CH$_3$ (p) | 266-267 | | | Dry white crystalline plates. |

Example 24

4-nitronaphthalic N-phenyl imide, 6.36 g., is dissolved in 2000 ml. of methanol. To the resulting solution, 10.8 g. of sodium methylate and then a catalytic amount of copper acetate are added. The resulted mixture is refluxed for 5 hours. After completion of the reaction, the reaction mixture is distilled to remove methanol therefrom, and it is added with water and glacial acetic acid and then filtered. 5.50 g. of 4-methoxynaphthalic N-phenyl imide as pale yellow precipitate are recovered. By repeating recrystallization, pure crystalline 4-methoxynaphthalic N-phenyl imide as pale yellow needles is obtained.

Example 25

The same procedures as in Example 24 are repeated, but using one of the following 4-nitronaphthalic N-alkyl, -cycloalkyl and -aryl imides instead of the 4-nitronaphthalic N-phenyl imide of Example 24, thereby to produce the corresponding 4-methoxynaphthalic N-substituted imides.

Example 26

4-chloronaphthalic N-phenyl imide (M.P. 241-3° C.), 10.2 g., is dissolved in 2000 ml. of methanol. To the resulting solution, 18 g. of sodium methylate and then a catalytic amount of copper acetate are added. The resulting mixture is refluxed for 5 hours. After completion of the reaction, the reaction mixture is distilled to remove methanol therefrom, and it is added with water plus glacial acetic acid and then filtered. 8.50 g. of 4-methoxynaphthalic N-phenyl imide as pale yellow precipitate are obtained. By repeating recrystallization from glacial acetic acid, pure crystalline 4-methoxynaphthalic N-phenyl imide as pale yellow needles is obtained. The result of elementary analysis is as follows—

Calcd.: N, 4.62%. Found: N, 4.50%.

Example 27

The same procedures as in Example 26 are repeated, but using one of the following 4-halonaphthalic imide compounds instead of the 4-chloronaphthalic N-phenyl imide of Example 26, thereby to produce the corresponding 4-methoxynaphthalic N-substitued or -unsubstituted imide.

4-chloronaphthalic methyl imide (M.P. 174–5° C.)
4-chloronaphthalic butyl imide (M.P. 92–4° C.)
4-chloronaphthalic p-tolyl imide (M.P. 240–2° C.)
4-chloronaphthalic p-anisyl imide (M.P. 227–8° C.)
4-bromonaphthalic butyl imide (M.P. 104–5° C.)
4-chloronaphthalimide (M.P. 301–2° C.)
4-bromonaphthalimide (M.P. 286° C.)

*Example 28*

One of the following 4-aminonaphthalimide and N-substituted imides thereof can be converted into the corresponding 4-alkoxynaphthalimide or N-substituted imides thereof.

4-aminonaphthalimide (M.P. >360° C.)
4-aminonaphthalic methyl imide (M.P. 344–6° C.)
4-aminonaphthalic ethyl imide (M.P. 279–280° C.)
4-aminonaphthalic n-propyl imide (M.P. 249–250.5° C.)
4-aminonaphthalic isopropyl imide (M.P. >350° C.)
4-aminonaphthalic n-butyl imide (M.P. 185–186° C.)
4-aminonaphthalic isopentyl imide (M.P. 166.5–167.5° C.)
4-aminonaphthalic hydroxyethyl imide (M.P. 260–1° C.)
4-aminonaphthalic cyclohexyl imide (M.P. 242–3° C.)
4-aminonaphthalic phenyl imide (M.P. 302–4° C.)
4-aminonaphthalic o-methylphenyl imide (M.P. 300–2° C.)
4-aminonaphthalic p-methylphenyl imide (M.P. 343–5° C.)
4-aminonaphthalic o-chlorophenyl imide (M.P. 299–302° C.)
4-aminonaphthalic p-chlorophenyl imide (M.P. >360° C.)
4-aminonaphthalic p-methoxyphenyl imide (M.P. 358–360° C.)
4-aminonaphthalic m-, o-, p-xylyl imides

*Example 29*

Two grams of polyester fiber (polyethylene terephthalate fiber) are dipped at 100° C. for one hour into aqueous dispersions containing 2% 4-methoxynaphthalimide (M.P. 320–1° C.), 4-methoxynaphthalic methylimide (M.P. 200–1° C.) and 4-methoxynaphthalic ethyl imide (M.P. 152–3° C.) respectively. In all cases, the polyester fiber is imparted with improved white appearance.

*Example 30*

Polyethylene terephthalate fiber is dipped at 60° C. into a dyeing bath having the following formulation:

4-methoxynaphthalimide, percent _____ 0.5–3
Anionic or nonionic surfactant, g./l. _____ 0.5
Bath ratio _____ 1:20–1:50

The bath temperature is raised up to 98–100° C., and at this temperature, dyeing is effected for 60 minutes. The dyed fiber is washed with water.

*Example 31*

Polyethylene terephthalate fiber is dyed with the same dyeing bath as in Example 30 at 120° C. for 30–45 minutes by means of a high temperature dyeing machine, and then it is washed with water. In this case, dyeing is effected within a shorter time than that required when using a commonly known whitening agent for polyester fibers.

*Example 32*

With a padding solution having the formulation:

4-methoxynaphthalimide, g./l. _____ 5–20
Sodium arginate or carboxymethyl cellulose, g./l. __ 1
Water, l. _____ 1

Polyethylene terephthalate fabric is padded at 30–50° C., squeezed to have the moisture content of 50–70°, subjected to moderate drying (at 80–90° C. for 2 minutes) by means of a hot air dryer and then heated at 180°–200° C. for 60–15 seconds. Then the padded fabric is soaped with a bath containing a neutral synthetic detergent (2 g./l.) at the bath ratio of 1:20 to 1:50 at 60°–70° C. for 10 minutes and thereafter washed with water.

*Example 33*

Polyethylene terephthalate fiber is dipped at about 60° C. a bath containing:

4-ethoxynaphthalimide, percent _____ 0.5–3
Anionic or nonionic surfactant, g./l. _____ 0.5
Chlorobenzene-type carrier, percent _____ 10–15
Bath ratio _____ 1:20–1:50

The bath temperature is raised up to 98°–100° C. over a period of about 20 minutes. At this temperature, dyeing is effected for 30 minutes. The fiber so treated is soaped in a bath containing a neutral synthetic detergent (2 g./l.) at the bath ratio of 1:20–1:50 at 60°–70° C. for 10 minutes and thereafter water-washed.

*Example 34*

An aqueous bleaching bath is prepared, which has the following formulation 4-methoxynaphthalimide, percent _____ 0.5–3
Sodium hypochlorite, percent _____ 5–10
Chlorous dioxide gas generation inhibitor, percent 2.5–5
Bath temperature _____ 1:20–1:50

The resulted bath is adjusted at a pH of 3–4 by the addition of 2–5 glacial acetic acid. Dyeing is started at a bath temperature of about 60° C. and then the temperature is raised up to 98°–100° C. over a period of about 20 minutes. Polyacrylonitrile fiber is maintained at that temperature for 30–60 minutes and then gradually cooled down to 70° C. The treated fiber is washed with water, treated with a sodium bisulfite (1 g./l.) solution at 60–70° C. for one hour and then washed with water. Thus whitening (optical brightening) and chemical bleaching are effected simultaneously.

To show the unique properties of the organic compounds as whitening agent, the following data will be given.

TABLE 1.—LIGHT FASTNESS EXPRESSED BY CHANGE IN RELATIVE INTENSIVENESS OF FLUORESCENCE

| Type of fibers | Irradiation time (hr.) | | | | |
|---|---|---|---|---|---|
| | 0 | 5 | 10 | 20 | 30 |
| Polyethylene terephthalate | 100 | 100 | 99 | 97 | 95 |
| Polyacrylonitrile | 100 | 98 | 95 | 93 | 90 |
| Cellulosic acetate | 100 | 100 | 99 | 97 | 95 |

In each of runs, a solution of 2% 4-methoxynaphthalimide was used for fibers. Polyethylene terephthalate fiber was treated by high temperature dyeing and polyacrylonitrile fiber was treated with a bath containing 2% 4- methoxynaphtalimide in combination with sodium hypochlorite.

TABLE 2.—LAUNDRY FASTNESS EXPRESSED BY CHANGE IN RELATIVE INTENSIVENESS OF FLUORESCENCE

| Method of testing | Type of fibers | | |
|---|---|---|---|
| | Polyethylene terephthalete | Polyacrylonitrile | Cellulosic acetate |
| Before testing | 100 | 100 | 100 |
| MC-2 | 102 | 102 | 97 |
| MC-3 | 102 | 101 | 93 |

The samples used are same as used in the preceding test for light fastness. Procedures for MC-2 and MC-3 are described in JIS-L-1945 (1959).

TABLE 3.—PERSPIRATION FASTNESS EXPRESSED BY CHANGE IN RELATIVE INTENSIVENESS OF FLUORESCENCE

| Method of testing | Type of fibers | | |
|---|---|---|---|
| | Polyethylene terephthalete | Polyacrylonitrile | Cellulosic acetate |
| Before testing | 100 | 100 | 100 |
| B-method (acidic condition) | 101 | 102 | 104 |
| B-method (alkaline condition) | 103 | 100 | 103 |

Procedures for B-method are described in JIS-L-1047 (1959).

*Examples 35–36*

These examples are to show the usefulness of 4-alkoxynaphthalic acid compounds and their anhydrides as whitening agents. All parts are by weight unless otherwise specified.

(A) To a dyeing bath (300 parts) containing one part of a mixture of 4-methoxynaphthalic acid anhydride and sodium methylenedinaphthalic sulfonate at the weight ratio of 2:3, 0.15 part of higher alcohol sulfate and the balance of water, prescoured polyethylene terephthalate fiber weighing 100 parts is charged. Dyeing is effected at 100° C. for 90 minutes. After soaping with a solution containing higher alcohol sulfate (2 g./l.) at 70° C. for 10 min., polyethylene telephthalate fiber with improved white appearance is obtained.

(B) With a padding solution (100 parts) containing one part of a mixture of 4-ethoxynaphthalic acid anhydride and sodium methylene-dinaphthalic sulfonate (2:3), 0.1 part of sodium arginate and the balance of water, polyethylene terephthalate fiber or the mixed-woven fabric is treated at 50° C. Then it is squeezed to have the water content of 60%. After repeating these procedures twice, the fiber is dried with hot air at 70° C. for 5 minutes and then treated with dry heat (at 200° C.) for 2 min. After soaping with 2 g./l. higher alcohol sulfate solution at 70° C. for 10 min., polyethylene terephthalate fiber or the mixed-woven fabric is obtained, which show excellent and durable white appearance.

*Example 37*

In 500 ml. of water, 21.1 g. of sodium hydroxide and 50.0 g. of 4-hydroxynaphthalic methyl imide are dissolved. To the resulting solution 55.5 g. of dimethyl sulfate are added gradually. Reaction is effected at 30° C. for 1 hour and then at 60° C. for another hour, while stirring. After completion of the reaction, the reaction mixture is filtered, whereby unreacted materials are passed to the filtrate. The precipitate recovered is washed with a dilute aqueous solution of sodium carbonate and then with water and thereafter it is dried. After recrystallization from acetic acid, 4-methoxynaphthalic methyl imide melting at 198.8–199.2° C. is obtained. Yield 15 g.

*Example 38*

In 300 ml. of water, 33.6 g. of sodium carbonate and 30.0 g. of 4-hydroxynaphthalic methyl imide are dissolved. To the resulting solution, 81.4 g. of diethyl sulfate are added gradually. Reaction is effected at 60° C. for 2 hours and then at 95° C. for 15 minutes. After completion of the reaction, the resultant product is worked up in the same manner as in Example 37. 15.0 g. of 4-ethoxynaphthalic methyl imide is obtained, which melts at 167.5–168.3° C.

*Example 39*

To a liquid mixture of 300 ml. of water, 16.1 g. of sodium carbonate and 30.0 g. of 4-hydroxynaphthalic methyl imide, 56.2 g. of ethyl iodide is added slowly. The resulting total mixture is heated with reflux for 3 hours. After completion of the reaction, the resultant product is worked up in the same manner as in Example 38. 4.0 g. of 4-ethoxynaphthalic methyl imide is obtained, which does not show any depression in melting point when mixed with the authentic sample.

*Example 40*

The same procedures as in either one of Examples 38 and 39 are repeated but using one of the following 4-hydroxynaphthalic N-alkyl, -cycloalkyl, -aralkyl and -aryl imides, thereby to produce the corresponding 4-ethoxynaphthalic N-substituted imides.

4-hydroxynaphthalic methyl imide (M.P. 303.5–305.5° C.)
4-hydroxynaphthalic butyl imide (M.P. 165.5–166.5° C.)
4-hydroxynaphthalic hydroxyethyl imide (M.P. 195.5–196.2° C.)
4-hydroxynaphthalic aminoethyl imide (M.P. 162.5° C. (decomp.))
4-hydroxynaphthalic cyclohexyl imide (M.P. 286.5–288.0° C.)
4-hydroxynaphthalic benzyl imide (M.P. 190.0–191.5° C.)
4-hydroxynaphthalic phenyl imide (M.P. 330° C.)

*Example 41*

(A) Naphthalimide-4-sulfonates and the N-substituted derivatives thereof, all which can be converted into 4-alkoxynaphthalimide or the N-substituted derivatives, are prepared as follows: Into 40 g. of an aqueous solution containing 10% methyl amine, 20.0 g. of sodium naphthalic acid-4-sulfonate are added. Reaction is effected at 15–30° C. for 5 hours. After completion of the reaction, the reaction mixture is filtered. The precipitate obtained is washed with saline water and then dried, thus producing white crystalline sodium naphthalic methyl imide-4-sulfonate. Yield 18.3 g.

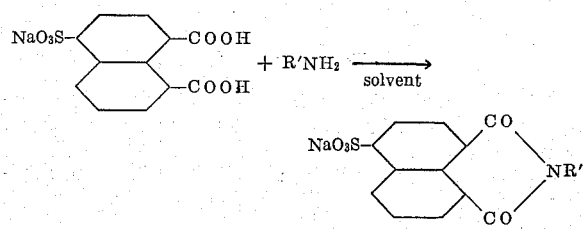

In the similar manner as stated above, a variety of the compounds as set forth below are prepared according to the just above chemical reaction.

| R' | Amount of R'NH₂, g. | Amount of sodium naphthalic acid-4-sulfonate, g. | Solvent | Yield of sodium naphthalic imide-4-sulfonate compds., g. |
|---|---|---|---|---|
| n-C₄H₉ | 73.0 | 63 | 100 g. H₂O | 67.4 |
| —CH₂CH₂OH | 9.6 | 10 | 86.5 g. H₂O | 11.2 |
| —CH₂— 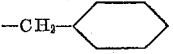 | 16.8 | 10 | 151 g. H₂O | 11.0 |
|  | 6.2 | 10 | 56 g. H₂O | 10.2 |
| 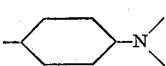 | 82.6 | 82.6 | 750 g. H₂O | 93.5 |
|  | 50.0 | 50.0 | 250 ml. MeOH plus 200 ml. H₂O | 38.6 |
| —CH₂—CH—C₂H₅<br>  \|<br>  (CH₂)₃—CH₃ | 78 | 64.0 | 350 ml. EtOH plus 350 ml. H₂O | 44 |
| —(CH₂)₃—N<CH₃<br>         \\CH₃ | 14.0 | 14.5 | 120 ml. H₂O | 10.5 |

NOTE.—Melting points of the resultants are unmeasurable because all of the resultants are in the form of alkali sulfonate.

(B) Sodium naphthalic alkyl or aryl imide-4-sulfonate thus obtained can be converted to the corresponding 4-alkoxynaphthalic alkyl or aryl imide by the following way: To a solution of 30 g. NaOH in 300 g. methanol, 30 g. of sodium naphthalic methyl imide-4-sulfonate are added. The resulting mixture is refluxed, with stirring, for 10 hours. After completion of the reaction, the resulting reaction mixture is cooled and then filtered. The separated precipitate is washed with methanol and then with warm water and it is dried. 22.8 g. of 4-methoxynaphthalic methyl imide is obtained, which has a melting point of 198.8–199.2° C. Analysis for C₁₄H₁₁NO₃ is—

Calcd.: C, 69.70%; H, 4.59%; N, 5.80%. Found: C, 69.61%; H, 4.84%; N, 5.73%.

In the same way as described above, the reactants A and B which are named in the following table are reacted thereby to form the corresponding resultant C of the table:

obtained. M.P. 196.8–198.5° C. Yield 10 g. Analysis for C₁₅H₁₃NO₄ is—

Calcd.: C, 66.41%; H, 4.83%; N, 5.16%. Found: C, 65.69%; H, 4.87%; N, 4.99%.

(B) To a liquid mixture of 300 g. of N,N-dimethylaminoethanol and 30.0 g. of sodium hydroxide, 30.0 g. of sodium naphthalic methyl imide-4-sulfonate are added. The total mixture is heated at 70° C. for 3 hours. Then, the resulting reaction mixture is cooled, and the separated precipitate is recovered by filtration, washed with water and dried. 4-N',N'-dimethylaminoethoxynaphthalic methyl imide is obtained. M.P. 142.8–144.0° C. Yield 21.9 g.

(C) To a liquid mixture of 500 g. of benzyl alcohol and 25.0 g. of sodium hydroxide, 50.0 g. of sodium naphthalic methyl imide-4-sulfonate are added. The total mixture is heated at 75–80° C. for 10 hours. Then, the resultant mixture is cooled and added with 500 g. of methanol. The

| A | B | C |
|---|---|---|
| Ethanol | Sodium naphthalic methyl imide-4-sulfonate. | 4-ethoxynaphthalic methyl imide. |
| n-Butanol | ___do___ | 4-n-butoxynaphthalic methyl imide. |
| 2-ethyl-hexanol | ___do___ | 4-2'-ethylhexoxy-naphthalic methyl imide. |
| Methanol | Sodium naphthalic butyl imide-4-sulfonate | 4-methoxynaphthalic butyl imide. |
| Do | Sodium naphthalic 2'-hydroxyethyl imide-4-sulfonate. | 4-methoxynaphthalic-2'-hydroxyethyl imide. |
| Do | Sodium naphthalic benzyl imide-4-sulfonate | 4-methoxynaphthalic benzyl imide. |
| Do | Sodium naphthalic cyclohexyl imide-4-sulfonate. | 4-methoxynaphthalic cyclohexyl imide. |
| Do | Sodium naphthalic N',N'-dimethylaminopropyl imide-4-sulfonate. | 4-methoxynaphthalic N',N'-dimethylaminopropyl imide. |

*Examples 42–45*

These examples show preparation of some of 4-alkoxynaphthalic methyl imides the alkoxyl groups of which are substituted ones.

(A) To a mixture of 300 g. of dioxane, 3.1 g. of ethylene glycol and 3 g. of sodium hydroxide, 31 g. of sodium naphthalic methyl imide-4-sulfonate are added. The total mixture is heated with refluxing for 5 hours. Then, the resulting reaction mixture is cooled. The separated precipitate is collected by filtration, washed with water and dried. 4-(2'-hydroxy)-ethoxynaphthalic methyl imide is separated product is recovered by filtration, washed with MeOH and water in turn, and then dried. 4-phenylmethoxynaphthalic methyl imide is obtained. M.P. 198.8–200.5° C. Yield 37 g. Analysis for C₂₀H₁₅NO₃ is as follows—

Calcd.: C, 75.69%; H, 4.76%; N, 4.41%. Found: C, 75.24%; H, 4.99%; N, 4.39%.

(D) To a liquid mixture of 300 g. of ethoxyethanol and 30.0 g. of sodium hydroxide, 30.0 g. of sodium naphthalic methyl imide-4-sulfonate are added. The resulting mixture is heated at 80° C. for one hour. After the reaction, the resultant mixture is cooled, and the separated precipitate is recovered by filtration, washed with water and then dried. 4-ethoxyethoxynaphthalic methyl imide is obtained. M.P. 124.5–126.0° C. Yield 16.2 g. Analysis for $C_{17}H_{17}NO_4$ is as follows—

Calcd.: C, 68.21%; H, 5.73%; N, 4.68%. Found: C, 67.59%; H, 5.65%; N, 4.52%.

*Examples 46–47*

These two examples will serve to show the essence of this invention which resides in the introduction of an electron-donating group into naphthalene nucleus preferably at its 4-position, because the resultants of the instant examples also show whitening effect to some extent although they may be less significant than 4-alkoxynaphthalimides and the N-substituted derivatives.

(A) A mixture of 114 g. of phenol and 15 g. of potassium hydroxide is heated at 140° C. until moisture is moved off, and then it is cooled. Thereto, 50 g. of 4-bromonaphthalic methyl imide are added. By heating the resulting mixture at 140° C. for 7 hours, reaction is effected. The resulted reaction mixture is passed into an aqueous dilute sodium hydroxide solution. The separated precipitate is recovered by filtration, washed with water and dried. Crude 4-phenoxynaphthalic methyl imide, 52 g., is obtained. M.P. 152.3–166·5° C. The recrystallization from glacial acetic acid raises the melting point to 177.5–178:5° C. Analysis for $C_{19}H_{13}NO_3$ is set forth.

Calcd.: C, 75.24%; H, 4.32%; N, 4.62%. Found: C, 74.55%; H, 4.39%; N, 4.48%.

(B) To a mixture of 123 g. phenol and 35 g. of KOH (which mixture has been dried by heating at 140° C. and then cooling), 30 g. of 4-nitronaphthalic N-phenyl imide are added. The resulting mixture is heated at 120° C. for 12 hours. The resulting reaction mixture is passed into a dilute aqueous hydroxide solution. The separated precipitate is recovered by filtration, washed with water and dried. Crude 4-phenoxynaphthalic N-phenyl imide (28 g.) melting at 271.1–273.8° C. is obtained. By recrystallizing it from glacial acetic acid, pure 4-phenoxynaphthalic N-phenyl imide is obtained. M.P. 274.0–275.2° C. Analysis for $C_{24}H_{15}NO_3$ is as follows—

Calcd.: C, 78.89%; H, 4.14%; N, 3.83%. Found: C, 78.7%; H, 4.09%; N, 3.88%.

I claim:
1. The compound of the formula

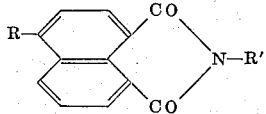

wherein R is a lower alkoxy group and R' is a member selected from the group consisting of hydrogen, lower alkyl, cyclohexyl, and monocyclic aryl.

2. A compound according to claim 1, wherein R is methoxy and R' is lower alkyl.

3. A compound according to claim 1, 4-methoxy naphthalimide.

4. A compound according to claim 1, 4-methoxy N-cyclohexyl naphthalimide.

5. A compound according to claim 1, 4-methoxy N-phenyl naphthalimide.

6. A compound according to claim 1, 4-methoxy N-(m-hydroxymethylphenyl) naphthalimide.

7. A compound according to claim 1, 4-methoxy N-(p-N, N-dimethylaminophenyl) naphthalimide.

8. A compound according to claim 1, 4-methoxy N-sulfophenyl naphthalimide, and the salts thereof with an alkali metal selected from the group consisting of sodium and potassium.

9. A compound according to claim 1, wherein R is ethoxy and R' is lower alkyl.

10. A compound according to claim 1, wherein R is ethoxy and R' is tolyl.

11. A compound according to claim 1, 4-ethoxy naphthalimide.

12. A compound according to claim 1, 4-ethoxy N-cyclohexyl naphthalimide.

13. A compound according to claim 1, 4-ethoxy N-phenyl naphthalimide.

References Cited by the Examiner

UNITED STATES PATENTS

| | | | |
|---|---|---|---|
| 1,625,826 | 4/1927 | Schmidt | 260—281 |
| 1,836,529 | 12/1931 | Eckert et al. | 260—281 |
| 2,231,495 | 2/1941 | Eckert et al. | 260—281 |
| 2,878,138 | 3/1959 | Raue et al. | 117—33.5 |
| 2,980,549 | 4/1961 | Craig | 117—33.5 |

OTHER REFERENCES

Anselm et al.: "Chemische Berichte," vol. 32, pp. 3290–95, (1899).

Beilstein: "Organische Chemie," vol. 21, containing the Literature up to 1910, pages 527–531.

Kon et al.: Chemical Abstracts, vol. 33, columns 6296–7, Abracting J. Chem. Soc. (London) 1939, pages 790–2.

Radt: "Elseviers' Encyclopedia of Organic Chemistry," vol. 12B, 1954, pages 4783–4797.

ALEX MAZEL, *Primary Examiner.*

IRVING MARCUS, DUVAL T. McCUTCHEN, NICHOLAS S. RIZZO, *Examiners.*

M. W. WESTERN, DONALD G. DAUS,
*Assistant Examiners.*